United States Patent
Stuckey

(10) Patent No.: US 10,479,146 B2
(45) Date of Patent: Nov. 19, 2019

(54) RAPID TIRE INFLATION SYSTEM

(71) Applicant: Bridgestone Americas Tire Operations, LLC, Nashville, TN (US)

(72) Inventor: Jon I. Stuckey, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 120 days.

(21) Appl. No.: 15/506,154

(22) PCT Filed: Nov. 17, 2015

(86) PCT No.: PCT/US2015/061029
§ 371 (c)(1),
(2) Date: Feb. 23, 2017

(87) PCT Pub. No.: WO2016/089593
PCT Pub. Date: Jun. 9, 2016

(65) Prior Publication Data
US 2017/0240006 A1    Aug. 24, 2017

Related U.S. Application Data

(60) Provisional application No. 62/087,011, filed on Dec. 3, 2014.

(51) Int. Cl.
*B60C 23/00*  (2006.01)
*B60C 5/22*  (2006.01)
*B60C 17/01*  (2006.01)

(52) U.S. Cl.
CPC ........... *B60C 23/004* (2013.01); *B60C 5/22* (2013.01); *B60C 17/01* (2013.01); *B60C 2200/08* (2013.01)

(58) Field of Classification Search
CPC .......... B60C 5/22; B60C 17/00; B60C 17/01; B60C 17/02; B60C 23/00; B60C 23/02; B60C 23/001; B60C 23/002; B60C 23/004; B60C 2200/08; B60C 15/0226
See application file for complete search history.

(56) References Cited

U.S. PATENT DOCUMENTS

| | | |
|---|---|---|
| 1,431,540 A | 10/1922 | Osgood |
| 2,167,398 A | 7/1939 | Tubbs |
| 2,216,368 A | 10/1940 | Granville |
| 2,268,370 A | 12/1941 | Barkeij |
| 2,301,096 A | 11/1942 | Truscott |

(Continued)

FOREIGN PATENT DOCUMENTS

| | | |
|---|---|---|
| CN | 200945805 Y | 9/2007 |
| CN | 202213455 U | 5/2012 |

(Continued)

OTHER PUBLICATIONS

EPO Search Report and Written Opinion in corresponding EP 15866219 dated Jun. 5, 2018, 7 pages.

(Continued)

*Primary Examiner* — Kip T Kotter

(57) ABSTRACT

A rapid inflation system is provided for the tires of a machine such as an agricultural machine which must periodically move between field conditions and road conditions. The system can relatively rapidly inflate the tires from a lower field ready state to a higher pressure road ready state by the use of a high pressure reservoir chamber defined within the tire.

21 Claims, 6 Drawing Sheets

(56) References Cited

U.S. PATENT DOCUMENTS

| | | | |
|---|---|---|---|
| 2,343,828 A | 3/1944 | Burkley | |
| 2,356,508 A | 8/1944 | Couturier | |
| 2,375,127 A | 5/1945 | Howard | |
| 2,391,841 A | 12/1945 | Howard | |
| 2,554,815 A | 5/1951 | Church | |
| 2,871,904 A | 2/1959 | Greenlee | |
| 2,934,127 A | 4/1960 | Howard | |
| 3,185,960 A | 5/1965 | Howard, Jr. et al. | |
| 3,480,064 A | 11/1969 | Huber | |
| 2,822,015 A | 2/1985 | Petrasek | |
| 5,176,764 A | 1/1993 | Abbott et al. | |
| 5,180,456 A * | 1/1993 | Schultz | B60C 23/003 141/1 |
| 5,301,729 A | 4/1994 | Blair | |
| 5,355,924 A | 10/1994 | Olney | |
| 5,538,061 A | 7/1996 | Blair | |
| 5,553,647 A | 9/1996 | Jaksic | |
| 6,401,743 B1 | 6/2002 | Naedler | |
| 6,601,625 B2 * | 8/2003 | Rheinhardt | B60C 23/004 152/415 |
| 7,314,072 B2 | 1/2008 | Bunker | |
| 7,669,627 B2 | 3/2010 | Douglas | |
| 8,360,121 B2 | 1/2013 | Caretta et al. | |
| 9,238,388 B2 * | 1/2016 | Fletcher | B60C 23/004 |
| 2005/0279160 A1 | 12/2005 | Nordhoff | |
| 2009/0030581 A1 * | 1/2009 | Pollklas | A01D 41/127 701/50 |
| 2011/0272074 A1 | 11/2011 | Lowery | |
| 2011/0284142 A1 | 11/2011 | Francois | |
| 2013/0174938 A1 | 7/2013 | Vanstevich | |
| 2013/0180641 A1 * | 7/2013 | French | B60C 5/08 152/458 |
| 2016/0332486 A1 * | 11/2016 | Strashny | B60C 17/01 |

FOREIGN PATENT DOCUMENTS

| | | | | |
|---|---|---|---|---|
| DE | 3727051 A1 * | 2/1989 | | B60B 21/12 |
| FR | 1063219 A | 4/1954 | | |
| JP | S55156706 A | 12/1980 | | |
| JP | 2002002241 A | 1/2002 | | |
| WO | WO1992008621 A1 | 5/1992 | | |
| WO | WO9618514 A1 | 6/1996 | | |
| WO | WO-2011033015 A1 * | 3/2011 | | B60C 23/003 |

OTHER PUBLICATIONS

Mitas, "Mitas AirCell dramatically boosts the performance of ttre inflation systems", dated on Oct. 1, 2015.

Fendt VarioGrip Pro, dated on Oct. 12, 2015.

International Search Report and Written Opinion for PCT/US2015/061029; dated Feb. 26, 2016; pp. 1-12; Korean Intellectual Property Office; Daejeon Metropolitan City; Republic of Korea.

"Goodyear unveils self-inflating tires for big trucks" from http://www.autoblog.com/2012/09/22/goodyear-unveils-self-inflating-tires-for-big-trucks/, dated on Sep. 22, 2012.

Written Opinion of the International Searching Authority in corresponding International Application No. PCT/US2015/061029, dated Feb. 26, 2016, 7 pp.

English Abstract of CN200945805Y, dated Sep. 12, 2007.

English Abstract of CN202213455U, dated May 9, 2012.

English Abstract of JPS55156706A, dated Dec. 6, 1980.

Karl Billen, European Search Report, dated Jul. 16, 2019, pp. 1-3, European Patent Office, Munich, Germany.

Machine translation of JP2002002241A published on Jan. 8, 2002 owned by Bridgestone Corporation.

Machine translation of FR1063219A published on Apr. 30, 1954 owned by Wingfoot Corporation.

Karl Billen, European Search Opinion, dated Jul. 16, 2019, pp. 1-2, European Patent Office, Munich, Germany.

* cited by examiner

RAPID TIRE INFLATION SYSTEM

BACKGROUND OF THE INVENTION

1. Field of the Invention

The present disclosure relates generally to a method and apparatus for adjusting air pressure within a tire. More particularly, the system provides for the rapid change between a field ready pressure and a road ready pressure for large agricultural tires when the agricultural vehicles on which the tires are used move from a field environment to a road environment and vice versa.

2. Description of the Prior Art

Large self-propelled agricultural equipment such as a tractor, combine harvester or high clearance sprayer spends most of its operational time in or around a cultivated field. As a result, the tires of the equipment are often adapted to address common concerns arising from using heavy machinery over a cultivated field. One of the common concerns is soil compaction. As large equipment travels over a given field, the soil beneath the equipment's tires will be compacted to increase in density. This soil compaction may be harmful to the production or yield of the field. As soil compaction increases, the yield will often decrease. In order to combat this problem, it is common for equipment operators to reduce the air pressure of the tires when the equipment is in the field. Experience has shown that a reduced tire air pressure can reduce the level of soil compaction in the field. As a result it can also increase the production and efficiency of the field.

While this reduced tire air pressure may be preferable in the field environment, an elevated tire pressure is still preferable when the equipment is traveling over a typical paved road. The elevated tire pressure allows each tire to roll more efficiently and achieve a higher maximum velocity. With many users being forced to transport their large agricultural equipment extended distances from one field to another, speed and efficiency during transport is important. However, the time needed to inflate or deflate a typical tire is often a hindrance to the ability to rapidly and efficiently move the agricultural equipment from the field environment to the road environment.

What is needed then is an improved tire inflation system addressing these concerns.

SUMMARY OF THE INVENTION

In one aspect an inflation system for use with a wheel and a tire includes a divider wall configured to divide an inner cavity of the tire into an upper chamber between a tread portion of the tire and the divider wall, and a lower chamber between the divider wall and the wheel. The system may include first and second pressure sensors arranged to be communicated with the upper and lower chambers. A first valve has an open position for communicating the upper and lower chambers and a closed position for isolating the upper chamber from the lower system. A second valve is configured to selectively communicate the lower chamber with a source of pressurized gas. A controller is operably associated with the first and second pressure sensors and the first and second valves. The controller is configured to define a field ready pre-charged mode wherein the upper chamber is inflated to a field ready pressure in a range of from 4 psi to 16 psi, the first valve is closed and the lower chamber is pre-charged to a pre-charged pressure. The pre-charged pressure is selected to have a value such that upon opening of the first valve a transition from the field ready pre-charged mode to a road ready mode wherein the upper chamber is inflated to a road ready pressure in a range of from 20 psi to 40 psi occurs in a transition time of no more than ten minutes.

In another embodiment a method is provided for inflating a tire mounted on a wheel. The method may include:
  (a) inflating the tire to a field ready pressure in a range of from 4 psi to 16 psi;
  (b) providing a high pressure gas reservoir within a cavity between the tire and the wheel, and pressurizing the reservoir to a pre-charged pressure; and
  (c) opening a valve communicating the reservoir with the cavity and inflating the tire from the field ready pressure to a road ready pressure in a range of from 20 psi to 40 psi with the high pressure gas from the reservoir in a transition time of no more than ten minutes.

In any of the above embodiments the transition time may be no more than five minutes.

In any of the above embodiments the field ready pressure may be in a range of from 20% to 50% of the road ready pressure, and more preferably in a range of 25% to 40% of the road ready pressure.

In any of the above embodiments the wheel, the tire and the divider wall may be configured such that the upper chamber has an upper chamber volume and the lower chamber has a lower chamber volume, and the lower chamber volume is in a range of from 20% to 40% of a total of the upper chamber volume and the lower chamber volume.

In any of the above embodiments the pre-charged pressure may be in a range of from 40 psi to 120 psi, and more preferably the pre-charged pressure is no greater than about 100 psi.

In any of the above embodiments the divider wall may be a portion of a toroidal bladder enclosing the lower chamber.

In any of the above embodiments the divider wall may be configured to sealingly engage opposed sidewalls of the tire.

In any of the above embodiments the tire sidewalls may include bead portions and the divider wall may include axially extending lips configured to be received between the bead portions of the tire and the wheel.

In any of the above embodiments each bead portion may have a notch defined therein and each axially extending lip of the divider wall may include a protrusion configured to fit within the notch of its associated bead portion.

In any of the above embodiments each axially extending lip may include a protrusion extending away from the bead portion and received in a complementary notch of the wheel.

In any of the above embodiments the divider wall may be integrally attached to the sidewalls of the tire.

In any of the above embodiments the controller may be configured to define a recharge mode wherein the first valve is closed, and the second valve is opened to communicate the lower chamber with the source of pressurized gas. In the recharge mode the lower chamber may recharge from the field ready pressure to the pre-charged pressure in no more than about one hour.

In any of the above embodiments the controller may be configured to define a deflation mode wherein the upper chamber is communicated with a low pressure zone and is deflated from the road ready pressure to the field ready pressure within no more than five minutes.

In any of the above embodiments the opening and closing of the respective valves may be performed in response to electrical command signals received from the controller.

DETAILED DESCRIPTION OF THE INVENTION

Definitions

Figure 1:
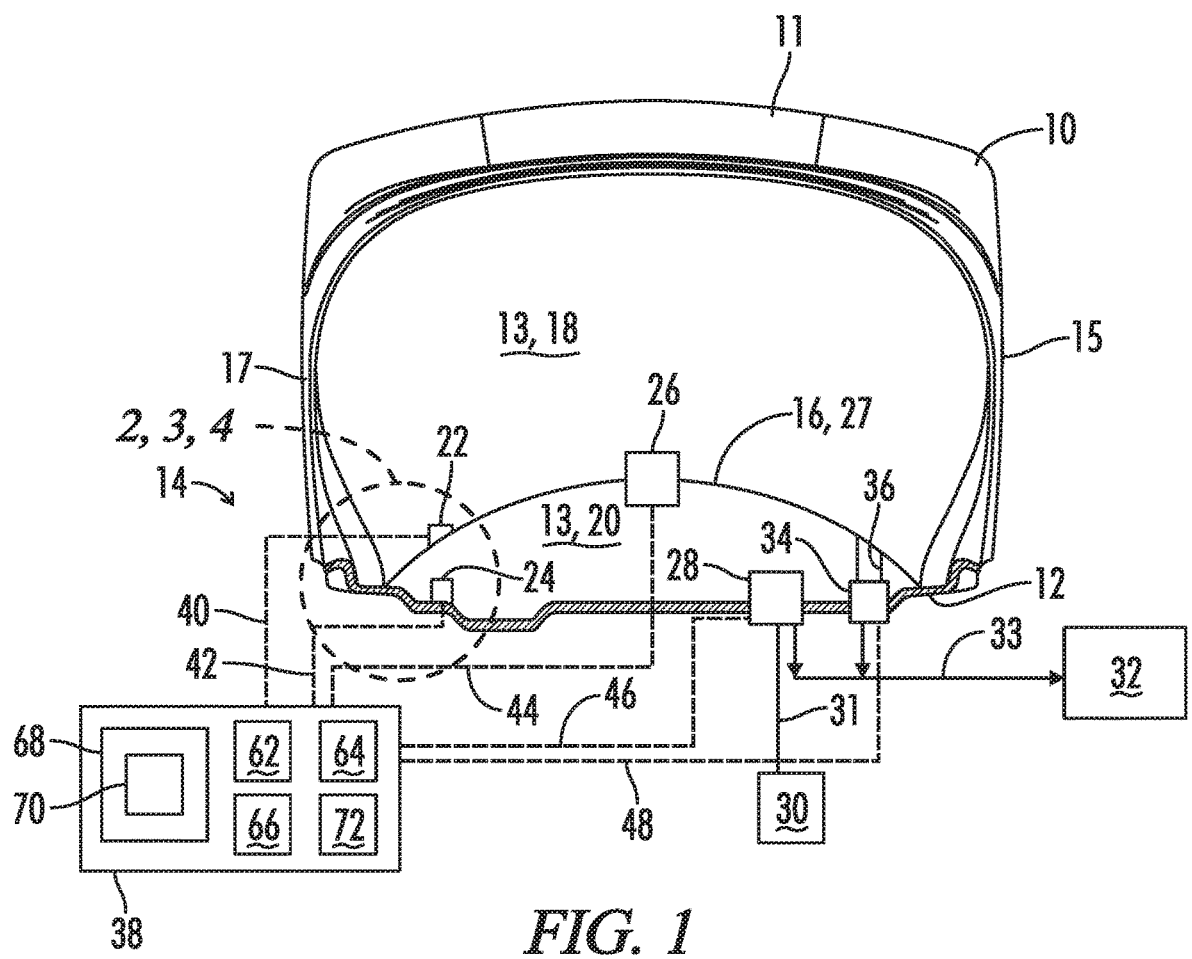
FIG. 1 is a schematic cross-section view of a tire mounted on a wheel and having the inflation system described herein.

Following are definitions of selected terms employed herein. The definitions include various examples and/or forms of components that fall within the scope of a term and that may be used for implementation. The examples are not intended to be limiting. Both singular and plural forms of terms may be within the definitions.

"Air" is understood to mean any inflating fluid suitable for use within a tire, including, but not limited to, gases containing some amount of nitrogen or oxygen. Consequently, "air pressure" is understood to mean the fluid pressure caused at least partially by the "air" contained within a body.

"Axial" and "axially" refer to directions which are parallel to the axis of rotation of a tire.

"Bead" or "bead core" refers to that part of a tire comprising an annular tensile member, the bead core, wrapped by ply cords and shaped, with or without other reinforcement elements to fit a designed tire rim.

"Belt" or "belt ply" refers to an annular layer or ply of parallel cords, woven or unwoven, underlying the tread, not anchored to the bead.

"Circumferential" refers to lines or directions extending along the perimeter of the surface of the annular tread perpendicular to the axial direction.

"Cord" means one of the reinforcement strands of which the plies in the tire are comprised.

"Crown" refers to substantially the outer circumference of a tire where the tread is disposed.

"Equatorial plane (EP)" refers to a plane that is perpendicular to the axis of rotation of a tire and passes through the center of the tire's tread.

"Inner liner" means the layer or layers of elastomer or other material that form the inside surface of a tubeless tire and that contain the inflating fluid within the tire.

"Ply" means a continuous layer of rubber coated parallel cords.

"Radial" and "radially" refer to directions that are perpendicular to the axis of rotation of a tire.

"Radial-ply" or "radial-ply tire" refers to a belted or circumferentially-restricted pneumatic structure wherein the ply cords are laid at cord angles between 65 degree and 90 degree with respect to the equatorial plane of a tire. Within a "radial-ply tire," the ply cords extend from bead to bead.

"Signal" may include any meaning as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. The terms "axially inward" and "axially inwardly" refer to a general direction towards the equatorial plane of the tire, whereas "axially outward" and "axially outwardly" refer to a general direction away from the equatorial plane of the tire and towards the sidewall of the tire. The term "when" is used to specify orientation for relative positions of components, not as a temporal limitation of the claims or apparatus described and claimed herein unless otherwise specified.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Referring now to FIG. 1, a tire 10 is shown mounted on a wheel 12. Associated with the tire 10 and wheel 12 is an inflation system 14. When the tire 10 is mounted on the wheel 12 an inner cavity 13 is defined between the tire and the wheel. The tire 10 includes a tread portion 11 and first and second sidewalls 15 and 17

The inflation system 14 includes a divider wall 16 configured to divide the inner cavity 13 of the tire into an upper chamber 18 and a lower chamber 20.

The upper chamber 18 which may also be referred to as an active inflation chamber 18 may be described as being between the tread portion 11 of the tire and the divider wall 16. The lower chamber 20 which may also be referred to as a reserve chamber 20 can be described as being between the divider wall and the wheel 12.

The inflation system 14 further includes first and second pressure sensors 22 and 24. The first pressure sensor is arranged to be communicated with the upper chamber 18, and the second pressure sensor is arranged to be communicated with the lower chamber 20.

The first pressure sensor 22 is shown being located on an upper surface 27 of divider wall 16, but it will be understood that the first pressure sensor 22 may be placed at any location so long as it is in communication with the upper chamber 18. The first pressure sensor 22 may be physically mounted on the divider wall 16, on the tire 10, or on the wheel 12.

Similarly, the second pressure sensor 24 is shown as mounted on the wheel 12, but it will be understood that it can be located in any way so long as it is in pressure communication with the lower chamber 20.

The inflation system 14 includes a first valve 26 which has an open position for communicating the upper and lower chambers 18 and 20 and a closed position for isolating the upper chamber 18 from the lower chamber 20.

A second valve 28 is shown extending through the wheel 12 and configured to communicate the lower chamber 20 with either a source 30 of pressurized gas via high pressure supply line 31 or a low pressure zone 32 via discharge line 33. As will be further described below, the second valve 28 may be a three-way valve which has a closed position, a pressurizing position wherein lower chamber 20 is communicated with pressure source 30, and a depressurizing position wherein low chamber 20 is communicated with lower pressure zone 32.

The inflation system 14 may optionally include a third valve 34 also mounted in the wheel 12 and directly communicated via passage 36 with the upper chamber 18. When the third valve is in its open position it will communicate the upper chamber 18 with the low pressure zone 32.

Each of the valves 26, 28 and 34 may either comprise a single valve or may comprise multiple valves having the same function.

Each of the valves 26, 28 and 34 may be electrically activated valves which move between the various positions in response to electrical signals from a controller 38.

The controller 38 is operably associated with the pressure sensors 22 and 24 and with the first, second and third valves 26, 28 and 34. Controller 38 receives pressure signals from first and second pressure sensors 22 and 24 via communication lines 40 and 42, respectively. Controller 38 may send command signals to valves 26, 28 and 34 via communication lines 44, 46 and 48, respectively. The communication lines 40-48 may be hard wired, or may comprise wireless communication paths between the controller 38 and the various associated components.

Divider Wall Construction

The structural construction of the divider wall 16 may take many different forms. For example, in the embodiment shown in FIG. 1, the divider wall 16 is an annular sheet-like member that extends axially between the first and second sidewalls 15 and 17 of the tire 10.

Figure 2:
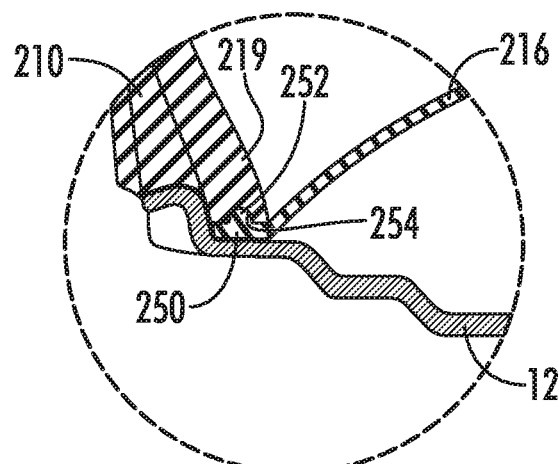
FIG. 2 is an enlarged view of the circled portion at the lower left of FIG. 1 showing one embodiment of the axial lip construction of the divider wall.

In the lower left corner of FIG. 1 a portion of the tire 10, wheel 12 and divider wall 16 is circled, and that circular area is enlarged in FIG. 2.

In the embodiment of FIG. 2 the divider wall 216 has on each end an axially extending lip 250 configured to be received between the bead portion 219 of tire 210 and the wheel 12. In the embodiment of FIG. 2, each axially extending lip 250 includes a radially outward extending protrusion 252 received within a complementary notch 254 defined in the bead portion 219 of the tire 210.

Figure 3:
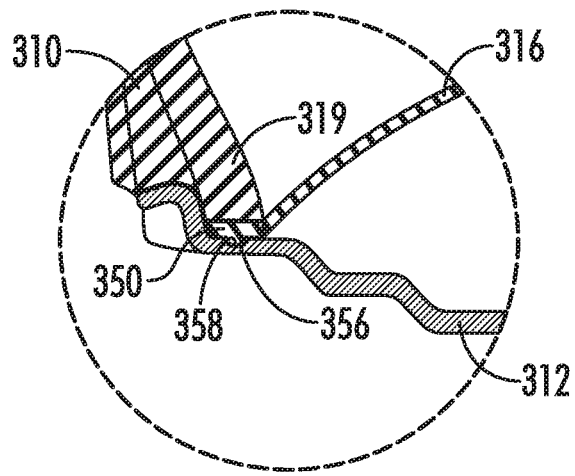
FIG. 3 is a view similar to FIG. 2 showing an alternative embodiment of the axial lip of the divider wall.

In an alternative embodiment of a divider wall 316 of tire 310 shown in FIG. 3, each axially extending lip 350 includes a protrusion 356 extending away from the bead portion 319 and received in a complementary notch 358 of the wheel 312.

Figure 4:
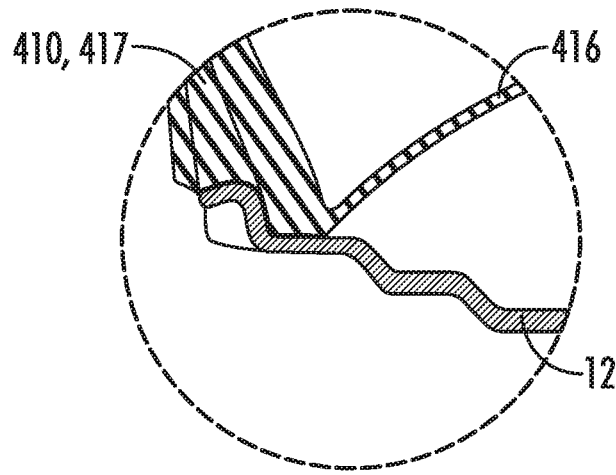
FIG. 4 is a view similar to FIG. 2 showing still another embodiment in which the divider wall is integrally constructed with the sidewalls of the tire.

In still another embodiment of a divider wall 416 shown in FIG. 4, the divider wall 416 may be integrally attached to the sidewall 417 of the tire 410.

Figure 5:
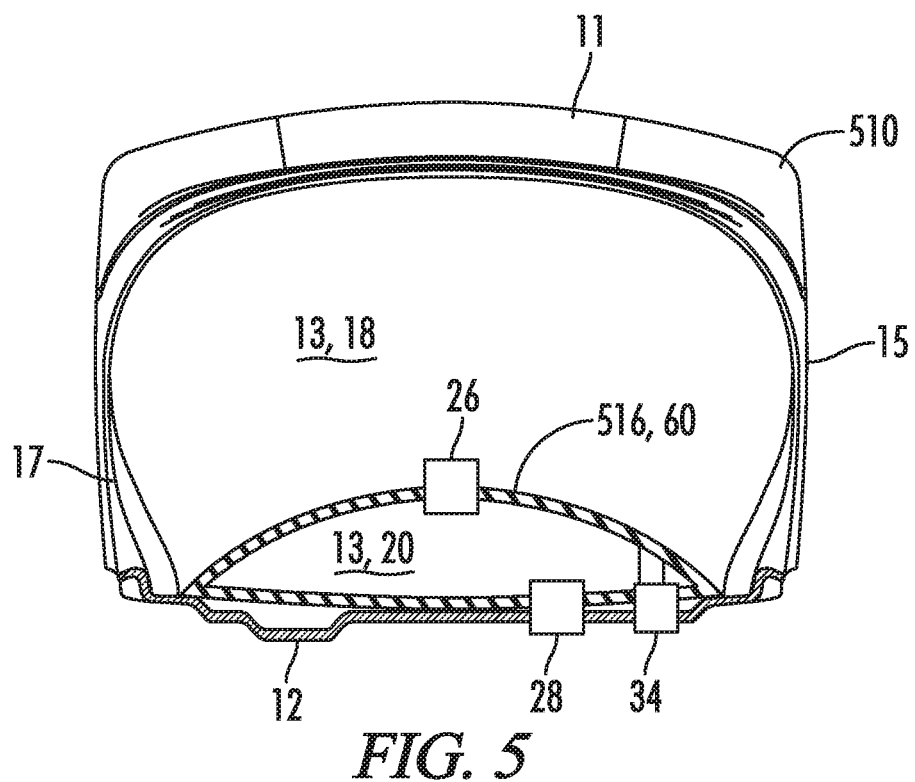
FIG. 5 is a cross-sectional view similar to FIG. 1, showing an alternative embodiment of the divider wall wherein the divider wall is a portion of the toroidal bladder enclosing the lower chamber.

FIG. 5 shows still another embodiment of a tire 510 wherein the divider wall 516 is a portion of a toroidal bladder 60 which encloses the lower chamber 20. The toroidal bladder 60 concentrically engages the wheel 12. The interface between the toroidal bladder 60 and the sidewalls 15 and 17 of the tire 510 may be similar to any of the constructions shown in FIGS. 2-4. In the following discussion of the construction and operation of the disclosed embodiments it will be understood that further references to tire 10 apply to any and all of the tires 10, 210, 310, 410 or 510, and further references to divider wall 16 apply to any and all of the divider walls 16, 216, 316, 416 or 516.

Any of the embodiments of the divider wall 16 and/or the toroidal bladder 60 described above regarding FIGS. 1-5 may have the divider wall 16 or the bladder 60 constructed of one or more plies of rubber coated parallel cords. If multiple layers are utilized, the layers are preferably oriented in the manner of bias plies with cords of alternating layers running in alternate directions. Additionally, the inner wall 16 and/or bladder 60 may be made of any other suitable materials. Although the inner wall 16 and bladder 60 may be flexible, it is not required that they flex for operational purposes. For purposes of the volume calculation set forth below it is presumed that any flexibility of the inner wall 16 is minimal and will be disregarded, thus assuming that the volume of the upper and lower chambers 18 and 20 remains constant during pressurization and depressurization of the chambers.

Additionally, it is noted that the divider wall 16 and/or toroidal bladder 60 may be constructed in a sufficiently rigid manner that the divider wall 16 and/or toroidal bladder 60 serves as a structural member which biases the first and second sidewalls 15 and 17 of the tire 10 axially outward away from each other so as to aid in maintaining the seal of the bead portions of the sidewalls on the wheel 12.

The Controller

Controller 38 includes a processor 62, a computer readable memory medium 64, a data base 66 and an input/output module or control panel 68 having a display 70.

The term "computer-readable memory medium" as used herein may refer to any non-transitory medium 64 alone or as one of a plurality of non-transitory memory media 64 within which is embodied a computer program product 72 that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

The controller 38 receives input data from the sensors 22 and 24. Based upon the programming 72 the controller 38 sends command signals to valves 26, 28 and 34 to control air pressure in the chambers 18 and 20 as is further described below.

EXAMPLES

The controller 38 is configured so as to control the operation of the various valves 26, 28 and/or 34 to control the pressurization and depressurization of the chambers 18 and 20 so as to define various modes of the inflation system 14. More particularly, the following description will explain the operation of the inflation system 14 and particularly the controller 38 to selectively modify the inflation pressure of the upper chamber 18 so as to inflate the upper chamber 18 to either a field ready pressure or a road ready pressure. For example, a field ready pressure in which the tire 10 is pressurized at a relatively low pressure so as to be utilized in a field and to reduce the compaction of the field by the tire, may comprise a pressure in the upper chamber 18 in a range of from 4 psi to 16 psi. A road ready pressure, on the other hand, will be at a relatively higher level which may for example involve inflating the upper chamber 18 to a road ready pressure in a range of from 20 psi to 40 psi. Furthermore, the inflation system 14 described herein is constructed to provide relatively rapid inflation of the upper chamber 18 from its field ready state to a road ready state, and by relatively rapid it is meant that the transition from field ready state to road ready state may occur in a transition time of no more than about ten minutes, and preferably no more than about five minutes. This allows the agricultural vehicle to be converted from a field ready state to a road ready state much quicker than has been possible with systems of the prior art. Similarly, the inflation system 14 provides for relatively rapid transition from the road ready state to a field ready state, in a transition time of no more than about ten minutes, and preferably in a transition time of no more than about five minutes.

The ability to make a rapid transition from a field ready state to a road ready state is provided by providing a sufficient volume of high pressure gas in the lower chamber 18 at a sufficiently high pressure that upon opening of the valve 26 and allowing the pressure to equalize between the upper and lower chambers 18 and 20, the equilibrium pressure throughout the cavity 13 will be at the desired road ready pressure. The time for achieving this equilibrium pressure may also be affected by the size of the flow passage through the valve 26 which may be selected to allow equilibrium to be achieved within the desired time frame.

It will also be understood, that the inflation system 14 may be designed and controlled such that the desired road ready pressure in the upper chamber 18 will be achieved before an equilibrium condition between upper and lower chambers 18 and 20 is achieved, in which case the valve 26 will be closed at a point in time where the remaining pressure in the lower or reserve chamber 20 is still in excess of the road ready pressure in the upper chamber 18.

Figure 6:
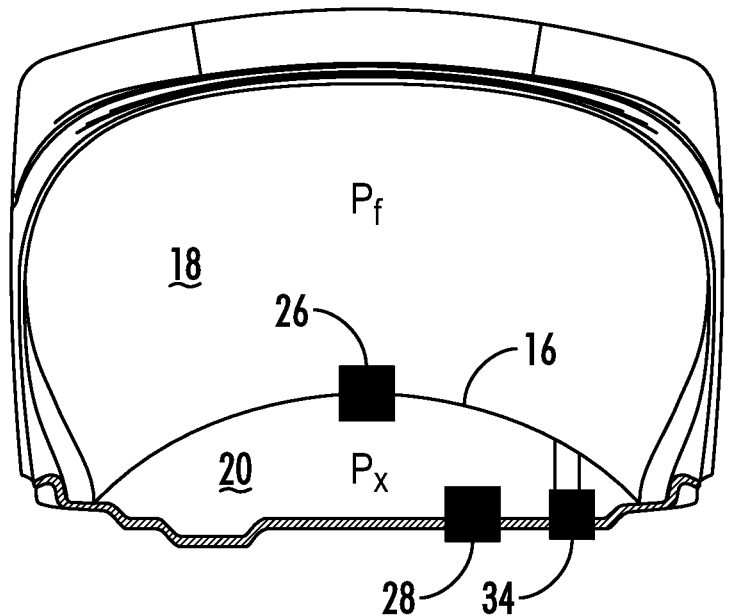
FIG. 6 is a schematic cross-section view similar to FIG. 1 and showing the configuration of the various valves and example pressures for one specific example wherein the tire and the inflation system is in a field ready pre-charged mode.

In FIG. 6, a schematic representation is provided of what may be described as a field ready pre-charged mode wherein the upper chamber is inflated to a field ready pressure $P_f$, and where the lower chamber 20 has been pre-charged to what may be described as a pre-charged pressure $P_x$, or alternatively $P_x$ may be referred to as a reservoir pressure. In FIG. 6, each of the valves 26, 28 and 34 is indicated as being in a closed position.

In the examples below, the assumption is that when it is desired to increase the pressure in the upper chamber 18 from the field ready pressure $P_f$ to a road ready pressure $P_r$, the valve 26 will be opened and the pressure within the cavities 18 and 20 will be allowed to equalize.

The pressure relationship between the pressure $P_f$ in the upper chamber 18 having a volume $V_f$, and the pressure $P_x$ in the lower chamber 20 having a volume $V_x$ may be described as follows:

$$P_f \times V_f + P_x \times V_x = P_r \times V_r$$

wherein $V_r = V_f + V_x$.

The volumes $V_f$ and $V_x$ are determined by the construction of the tire 10 and wheel 12 and the construction of the divider wall 16 which determines the subsequent volumes into which the volume of the cavity 13 is divided. Thus the volumes $V_f$ and $V_x$ are determined by the construction of the divider wall 16. For a selected volume $V_x$ which may be described as a percentage of the total volume $V_r$, then given any assumed desired field ready pressure $P_f$ and road ready pressure $P_r$, the necessary pre-charged pressure $P_x$ for the reserve chamber 20 may be calculated by the formula:

$$P_x = \frac{P_r \times V_r - P_f \times V_f}{V_r - V_f}$$

Several examples of tire sizes and applicable field ready pressures and road ready pressures for which the inflation system 14 is designed may include the following:

TABLE I

| Tire Size | Field Ready Pressure $P_f$ (PSI) | Road Ready Pressure $P_r$ (PSI) |
|---|---|---|
| 480/80R50 | 12-14 | 35 |
| 480/80R46 | 12-14 | 35 |

TABLE I-continued

| Tire Size | Field Ready Pressure $P_f$ (PSI) | Road Ready Pressure $P_r$ (PSI) |
|---|---|---|
| 710/70R42 | 6 | 29 |
| 800/70R38 | 6 | 23 |

Choosing the tire size 800/70R38 from Table I, the cavity 13 of such a tire has a total volume of 85,500 cubic inches. For such an 800/70R38 tire, and for various selections of the construction of divider wall 16 so as to define the volume $V_x$ of the lower chamber 20 as a percentage of the total volume $V_r$ of cavity 13, the relative magnitudes of the necessary reservoir pressure $P_x$ within the chamber volume $V_x$ in order to inflate from a field pressure $P_f$ of 6 psi to a road ready pressure $P_r$ of 23 psi, are shown in the following Table II:

TABLE II (800/70R38)
$V_r$ = 85,500 in³, $P_f$ = 6 psi, $P_r$ = 23 psi

| $V_x$ | % $V_r$ | $P_x$ |
|---|---|---|
| 8550 | 10% | 176 |
| 17100 | 20% | 91 |
| 25650 | 30% | 63 |
| 34200 | 40% | 49 |
| 42750 | 50% | 40 |

Another factor which must be considered in the design of the divider wall 16, is the height of the divider wall 16 above the wheel 12, which inversely determines the clearance between the divider wall 16 and the tread portion 11 of the tire 10. It will be understood that when operating the tire 10 in a field ready mode at very low inflation pressures there will be substantial deflection of the tread area 11 toward the wheel 12, and the divider wall 16 should be designed such that the tread portion 11 does not contact the divider wall 16. The amount of permissible deflection of any given tire will vary and will need to be considered when designing the appropriate inflation system 14 for that tire and when selecting inflation pressures and reservoir pressures to be utilized.

Additionally, safety and operational considerations may place upper limits on the desired pressures within the reserve chamber 20. In general it is preferred that the pre-charged pressure $P_x$ in the reserve chamber 20 be no greater than about 100 psi.

Figure 7:
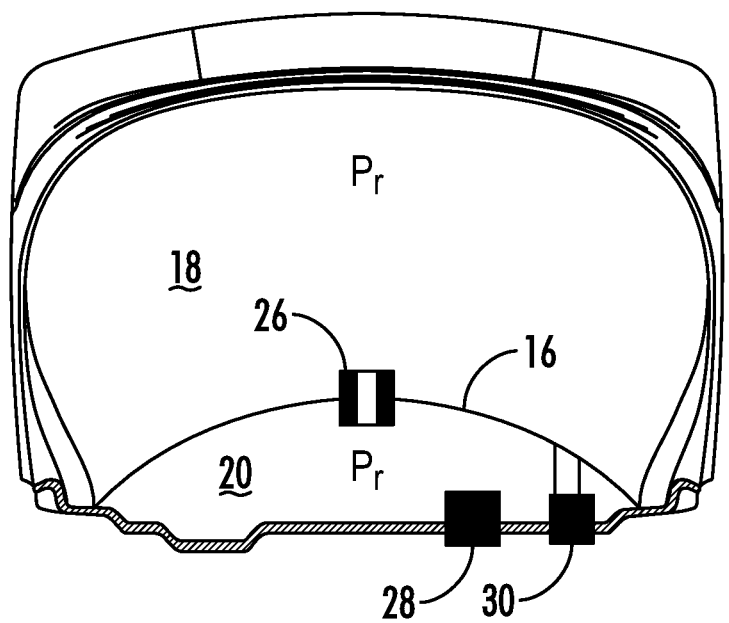
FIG. 7 is a view similar to FIG. 6 showing the valve positions during transition from the field ready pre-charged mode of FIG. 6 to the road ready mode, and also representative of the road ready mode.

Taking these factors into consideration, one suitable design of the inflation system 14 for a size 800/70R38 tire having a cavity volume of approximately 85,500 cubic inches is to design the divider wall 16 such that the volume $V_x$ of the reserve chamber 20 is approximately 23,900 cubic inches which is approximately 28% of the total volume of the cavity 13. For such a volume $V_x$, the necessary pre-charged pressure $P_x$ is approximately 67 psi. Beginning with a field ready pressure $P_f$ in the upper chamber 18 of 6 psi, and a reservoir pressure $P_x$ in the lower chamber 20 of 67 psi, upon opening of the valve 26 as illustrated in FIG. 7, and allowing the pressure to equalize between chambers 18 and 20, the resulting equilibrium pressure $P_r$ in the upper chamber 18 and lower chamber 20 will be approximately 23 psi which is the desired road ready pressure for the tire size in question.

The preferred field ready pressures and road ready pressures for the four tire sizes shown in Table I may be described as a field ready pressure that is in a range of from 20% to 50% of the road ready pressure, and more preferably wherein the field ready pressure is in a range of from 25% to 40% of the road ready pressure.

For the example set forth in the above Table II, the system 14 may be described as having the wheel 12, the tire 10 and the divider wall 16 configured such that the lower chamber volume $V_x$ is in a range of from 20% to 40% of the total volume of the cavity 13, which would result in a pre-charged pressure in the range of from 49 psi to 91 psi.

Referring again to FIG. 7, as previously noted it represents a road ready mode wherein the pressure $P_r$ in the upper chamber 18 has equalized with the pressure in the lower chamber 20 at a desired road ready level. After the pressure in the upper chamber 18 is equalized, or if the pressure in the upper chamber reaches the desired road ready pressure prior to equalization, the valve 26 may then be closed.

Figure 8:
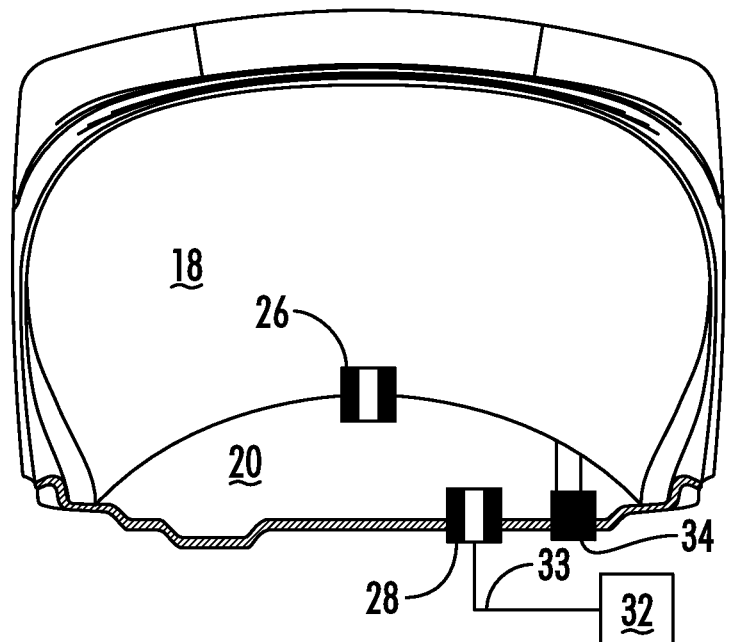
FIG. 8 is a view similar to FIG. 6 showing one possible valve positioning for the discharge of pressure from the upper chamber to return the tire from road ready mode to field ready mode.
Figure 9:
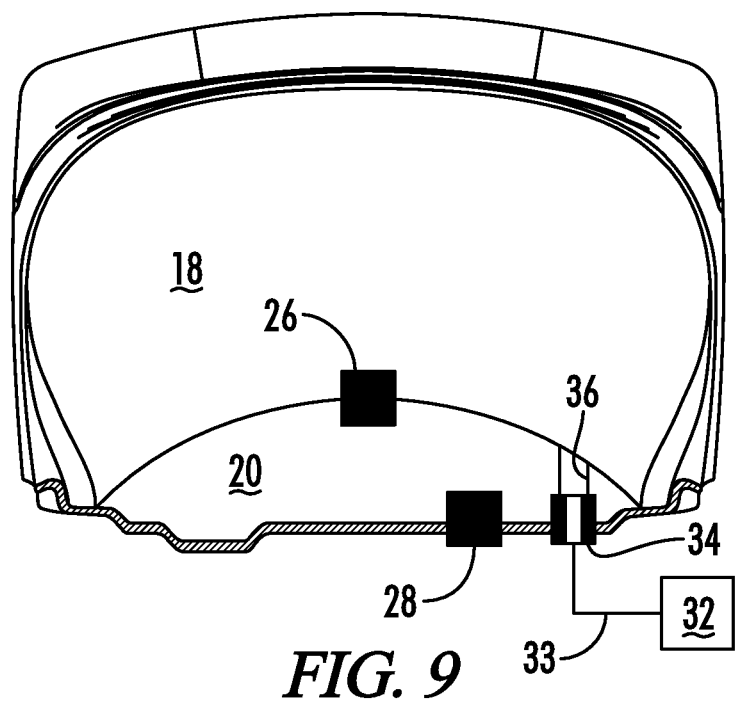
FIG. 9 is a view similar to FIG. 6 showing a second possible valve arrangement for returning the tire from the road ready mode to the field ready mode.
Figure 10:
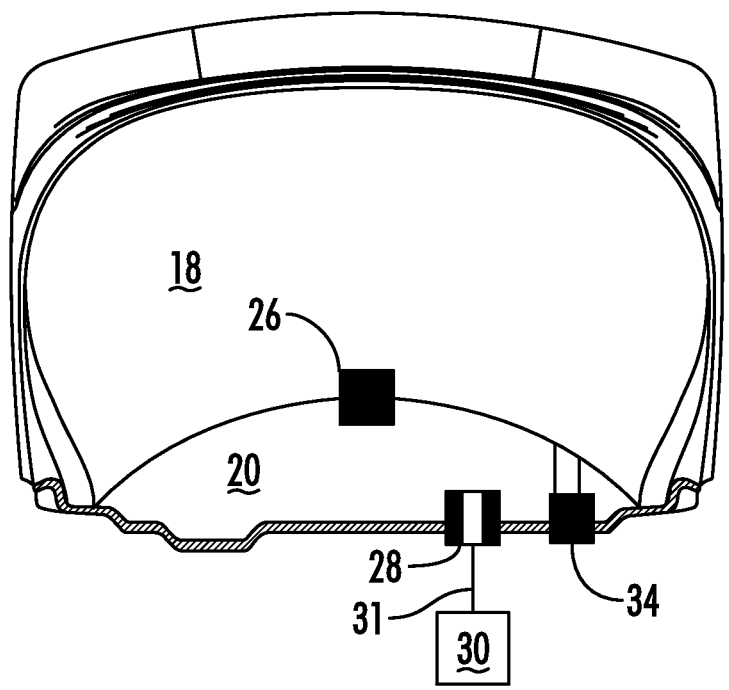
FIG. 10 is a view similar to FIG. 6 showing a valve arrangement for recharging the lower reservoir chamber of the tire to return the tire to the field ready pre-charged condition of FIG. 6.

FIGS. 8-10 illustrate other operating conditions of the inflation system 14. FIG. 8 illustrates a first optional technique for deflating the upper chamber 18 from the road ready condition back to a field ready condition. In the first discharge mode illustrated in FIG. 8, the first valve 26 is opened and the second valve 28 is moved to its discharge position where it is opened to communicate the lower chamber 20 with the low pressure zone 32 via discharge passage 33. The low pressure zone 32 may for example simply be the ambient pressure surrounding the tire 10. In this embodiment, the pressure in upper chamber 18 is allowed to drop until it reaches the desired field ready pressure, and then the valve 26 is again closed as is the valve 28. In the deflation or discharge mode described with reference to FIG. 8, it is apparent that the pressure in the lower chamber 20 is also discharged.

FIG. 9 schematically illustrates a second discharge mode which is possible if the third valve 34 is provided in the inflation system 14. The third valve 34 may be opened to provide direct communication via passage 36 between the upper chamber 18 and the low pressure zone 32 thus allowing deflation of the upper chamber 18 without deflating the reserve chamber 20. This avoids loss of the pressure in lower chamber 18, which may in fact already be recharged to a full pre-charged state, thus allowing for more rapid cycling from a road ready condition to a field ready condition and back to a road ready condition.

Finally, FIG. 10 schematically illustrates a recharge mode in which the first valve 26 is closed, and the second valve 28 is opened and is communicated with source 30 via pressure supply line 31.

The time desired for recharging of the reserve chamber 20 will vary depending upon the nature of the machine upon which the tire 10 and inflation system 14 is mounted. For example, if the tire is mounted on an agricultural machine which moves between the field and the road relatively infrequently, perhaps once or twice a day, then it is entirely adequate for the pressure source 30 to be such that it takes perhaps one hour to recharge the reserve chamber 20. If the pressure source 20 is for example a compressor system carried on the agricultural machine, then it is simply an issue of sizing the compressor system such that it can recharge the reserve chamber 20 of each of the tires of the machine back to the desired pre-charged pressure within the allotted time. If faster return to pre-charged status is desired, then the compressor system must be suitably increased in size.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. An inflation system for use with a wheel and a tire, the inflation system comprising:
   a divider wall configured to divide an inner cavity of the tire into an upper chamber between a tread portion of the tire and the divider wall, and a lower chamber between the divider wall and the wheel;
   a first pressure sensor arranged to be communicated with the upper chamber;
   a second pressure sensor arranged to be communicated with the lower chamber;
   a first valve having an open position for communicating the upper and lower chambers, and a closed position for isolating the upper chamber from the lower chamber;
   a second valve configured to selectively communicate the lower chamber with a source of pressurized gas; and
   a controller operably associated with the first and second pressure sensors and the first and second valves, the controller being configured to define a field ready pre-charged mode wherein the upper chamber is inflated to a field ready pressure in a range of from 4 psi to 16 psi, the first valve is closed and the lower chamber is pre-charged to a pre-charged pressure, the pre-charged pressure being such that upon opening of the first valve a transition from the field ready pre-charged mode to a road ready mode wherein the upper chamber is inflated to a road ready pressure in a range of from 20 psi to 40 psi occurs in a transition time of no more than ten minutes, wherein the field ready pressure is in a range of from 20% to 50% of the road ready pressure.

2. The system of claim 1, wherein the transition time is no more than five minutes.

3. The system of claim 1, wherein the field ready pressure is in a range of from 25% to 40% of the road ready pressure.

4. The system of claim 1, wherein:
   the wheel, the tire and the divider wall are configured such that the upper chamber has an upper chamber volume and the lower chamber has a lower chamber volume, and the lower chamber volume is in a range of from 20% to 40% of a total of the upper chamber volume and the lower chamber volume.

5. The system of claim 4, wherein the pre-charged pressure is no greater than 100 psi.

6. The system of claim 1, further comprising:
   a toroidal bladder enclosing the lower chamber, wherein the divider wall is a portion of the toroidal bladder and the toroidal bladder is configured to concentrically engage the wheel.

7. The system of claim 1, further including the tire and wherein the divider wall is configured to sealingly engage opposed sidewalls of the tire.

8. The system of claim 7, wherein:
   the tire sidewalls include bead portions; and
   the divider wall includes axially extending lips configured to be received between the bead portions and the wheel.

9. The system of claim 8, wherein:
   each bead portion has a notch defined therein; and
   each axially extending lip includes a protrusion configured to fit within the notch of its associated bead portion.

10. The system of claim 8, wherein:
    each axially extending lip includes a protrusion extending away from the bead portion to be received in a complementary notch of the wheel.

11. The system of claim 1, further including the tire having sidewalls, and wherein the divider wall is integrally attached to the sidewalls of the tire.

12. The system of claim 1, wherein:
    the controller is configured to define a recharge mode wherein the first valve is closed, and the second valve is open to communicate the lower chamber with the source of pressurized gas, and in the recharge mode the lower chamber recharges from the field ready pressure to the pre-charged pressure in no more than one hour.

13. The system of claim 1, wherein:
    the controller is configured to define a deflation mode wherein the upper chamber is communicated with a low pressure zone and is deflated from the road ready pressure to the field ready pressure within no more than five minutes.

14. A method of inflating a tire mounted on a wheel, the method comprising:
    (a) inflating the tire to a field ready pressure in a range of from 4 psi to 16 psi;
    (b) providing a high pressure gas reservoir within a cavity between the tire and the wheel, and pressurizing the reservoir to a pre-charged pressure; and
    (c) opening a valve communicating the reservoir with the cavity and inflating the tire from the field ready pressure to a road ready pressure in a range of from 20 psi to 40 psi with the high pressure gas from the reservoir in a transition time of no more than ten minutes, wherein the field ready pressure is in a range of from 20% to 50% of the road ready pressure.

15. The method of claim 14, wherein:
    in step (c) the transition time is no more than five minutes.

16. The method of claim 14, wherein:
    the field ready pressure is in a range of from 25% to 40% of the road ready pressure.

17. The method of claim 14, wherein:
    the reservoir has a volume in a range of from 20% to 40% of a volume of the cavity.

18. The method of claim 14, wherein:
    in step (b) the pre-charged pressure is no greater than 100 psi.

19. The method of claim 14, further comprising:
    after step (c), recharging the reservoir to the pre-charged pressure in no more than one hour.

20. The method of claim 14, further comprising:
    after step (c), communicating the cavity with a low pressure zone and deflating the tire back to the field ready pressure in no more than five minutes.

21. The method of claim 14, wherein:
    step (c) is performed in response to an electrical command signal from a controller.

* * * * *